United States Patent [19]

Sawyer et al.

[11] Patent Number: 4,640,812
[45] Date of Patent: Feb. 3, 1987

[54] NUCLEAR SYSTEM TEST SIMULATOR

[75] Inventors: Steven D. Sawyer; William D. Hill; Patricia A. Wilson; William M. Steiner, all of San Jose, Calif.

[73] Assignee: General Electric Company, San Jose, Calif.

[21] Appl. No.: 619,727

[22] Filed: Jun. 11, 1984

[51] Int. Cl.⁴ ............................................. G21C 17/00
[52] U.S. Cl. .................................... 376/245; 376/259
[58] Field of Search ............... 376/245, 217, 259, 228; 324/208

[56] References Cited

U.S. PATENT DOCUMENTS

| 3,896,041 | 7/1975 | Alliston et al. | 376/217 |
|---|---|---|---|
| 3,914,794 | 10/1975 | Czerniejewski | 376/217 |
| 3,919,720 | 11/1975 | Alliston | 376/217 |
| 3,932,885 | 1/1976 | Czerniejewski | 376/217 |
| 4,170,754 | 10/1979 | Schmitz et al. | 324/208 |
| 4,363,778 | 12/1982 | Abbott | 376/228 |

FOREIGN PATENT DOCUMENTS 2935108  8/1979  Fed. Rep. of Germany .

OTHER PUBLICATIONS

Nuclear Power Plant Control and Instrumentation, 1978, vol. II, Proceedings, pp. 43–54, Gallagher et al., International Atomic Energy Commission—1978.
Application of Semiconductor Logic Components in Reactor Safety and Regulation Systems, David et al., pp. 700–704, IEEE, Trans. on Nuc. Science, vol. NS-29, No. 1, 2/82.
Nuclear Power Plant Control and Instrumentation, 1978, vol. II, Proceedings, pp. 81–94, Darier et al., International Atomic Energy Commission–1978.

Primary Examiner—Salvatore Cangialosi
Attorney, Agent, or Firm—Ivor J. James, Jr.; Raymond G. Simkins

[57] ABSTRACT

A portable, microprocessor-based test instrument for the calibration, check testing, and checkout of nuclear power reactor systems under simulated operating conditions. The instrument includes a master microprocessor bus having direct communication to interchangeable plug-in printed circuit boards. Applications to which the invention may be put include rod control simulation and analysis, neutron monitoring system analysis, and rod block monitoring system simulation and analysis. The test instrument electronically interconnects at any of a plurality of points within a reactor control and monitoring system. The electrical network from the point of interconnection to the core rods is disabled and the test instrument, receives serial control command signals as would the disabled portion of the network. The test instrument also generates appropriate acknowledgements and response signals. Alternatively, a test instrument can generate faulty response signals to simulate improper command responses.

8 Claims, 9 Drawing Figures

Microfiche Appendix Included
(7 Microfiche, 390 Pages)

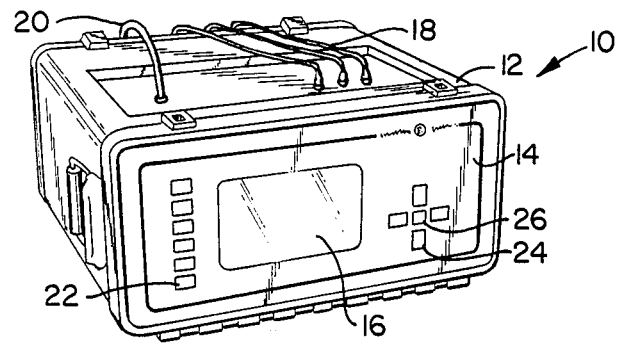
FIG._1.
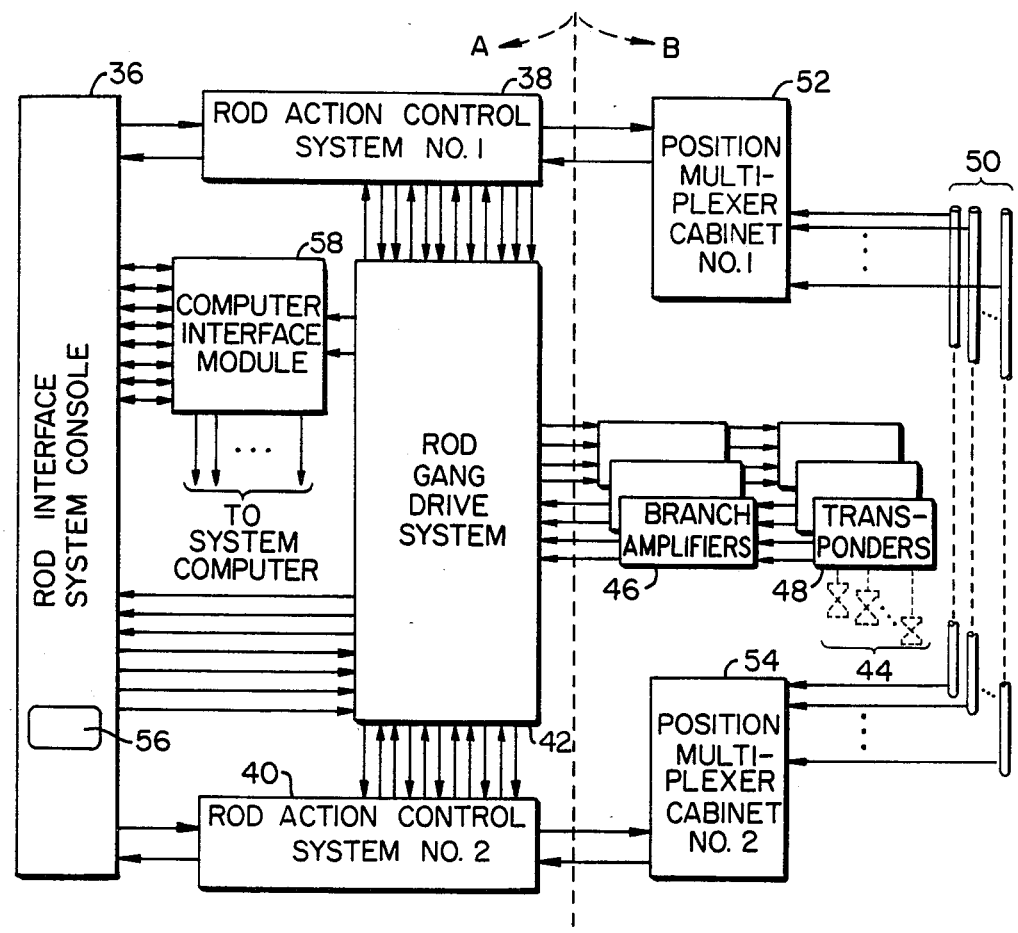
FIG._3.

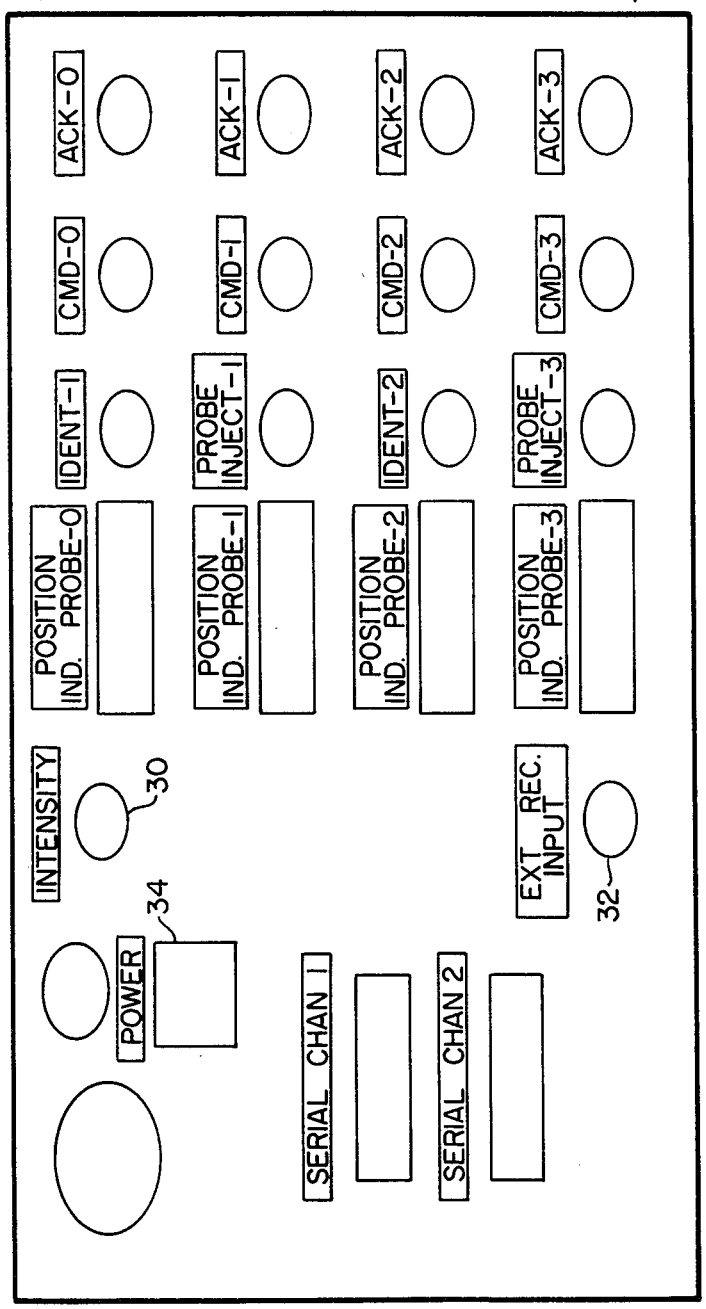
FIG._2. NSTS ELECTRICAL CONNECTIONS

FIG._4.

TRANSMITTING PROCESS WORD STATUS: STOPPED

SEQUENCE ☐ POLARITY [+] CHANNEL: PROBE / INT-1

| COORDINATE PLANT | | | | | | | | | | | | | | | | |
|---|---|---|---|---|---|---|---|---|---|---|---|---|---|---|---|---|
| 67 | | | | | | | | | | | | | | | | |
| 63 | | | | | | | 48 | 00 | 48 | | | | | | | |
| 59 | | | | | | 00 | 48 | 00 | 48 | 00 | | | | | | |
| 55 | | | | | 48 | 00 | 48 | 00 | 48 | 00 | 48 | | | | | |
| 51 | | | | 00 | 48 | 00 | 48 | 00 | 48 | 00 | 48 | 00 | | | | |
| 47 | | | 48 | 00 | 48 | 00 | 48 | 00 | 48 | 00 | 48 | 00 | 48 | | | |
| 43 | | | 00 | 48 | 00 | 48 | 00 | 48 | 00 | 48 | 00 | 48 | 00 | 48 | 00 | |
| 39 | | 48 | 00 | 48 | 00 | 48 | 00 | 48 | 00 | 48 | 00 | 48 | 00 | 48 | 00 | 48 |
| 35 | | 00 | 48 | 00 | 48 | 00 | 48 |   | 48 | 00 | 48 | 00 | 48 | 00 | 48 | |
| 31 | | 48 | 00 | 48 | 00 | 48 | 00 | 48 | 00 | 48 | 00 | 48 | 00 | 48 | | | |
| 27 | | | 00 | 48 | 00 | 48 | 00 | 48 | 00 | 48 | 00 | 48 | 00 | 48 | | | |
| 23 | | | | 00 | 48 | 00 | 48 | 00 | 48 | 00 | 48 | 00 | 48 | 00 | | | |
| 19 | | | | | 48 | 00 | 48 | 00 | 48 | 00 | 48 | 00 | 48 | | | | |
| 15 | | | | | | 48 | 00 | 48 | 00 | 48 | 00 | 48 | | | | | |
| 11 | | | | | | | 00 | 48 | 00 | 48 | 00 | | | | | | |
| 7 | | | | | | | | 48 | 00 | 48 | | | | | | | |
| 3 | | | | | | | | | | | | | | | | | |
| | 2 | 6 | 10 | 14 | 18 | 22 | 26 | 30 | 34 | 38 | 42 | 46 | 50 | 54 | 58 | 62 | 66 |

COORDINATE PLANT

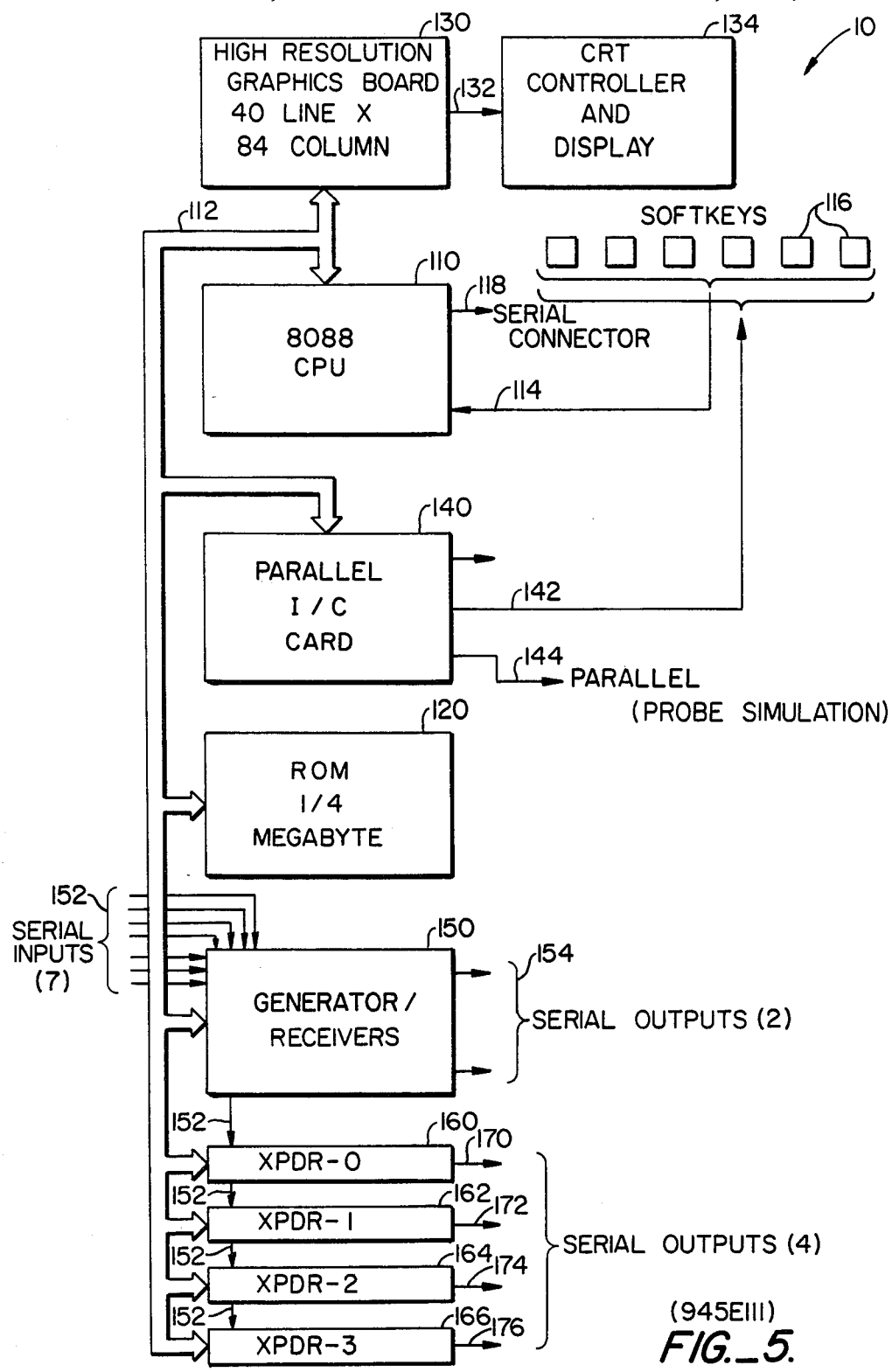
FIG._5.

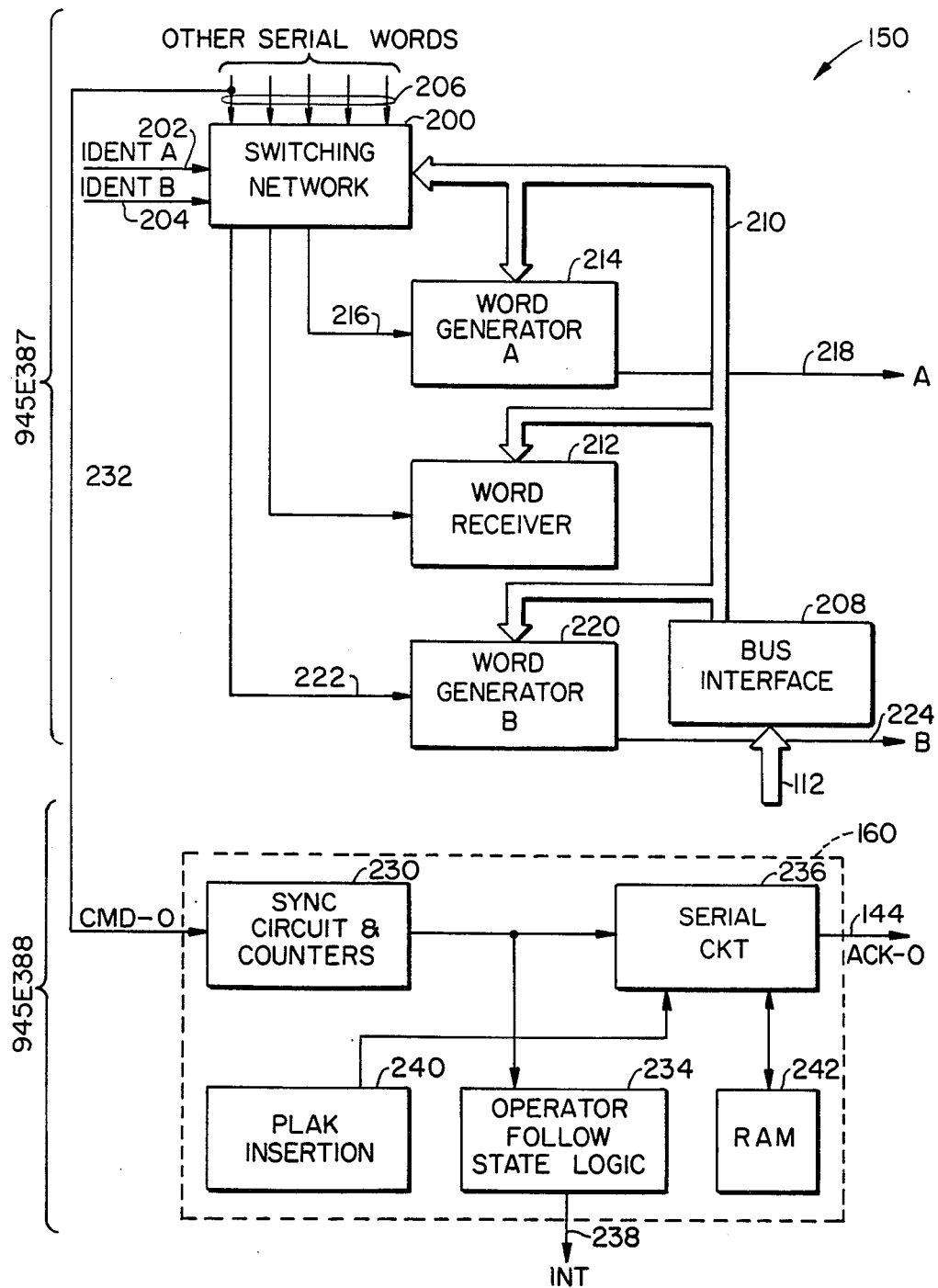
FIG._6.

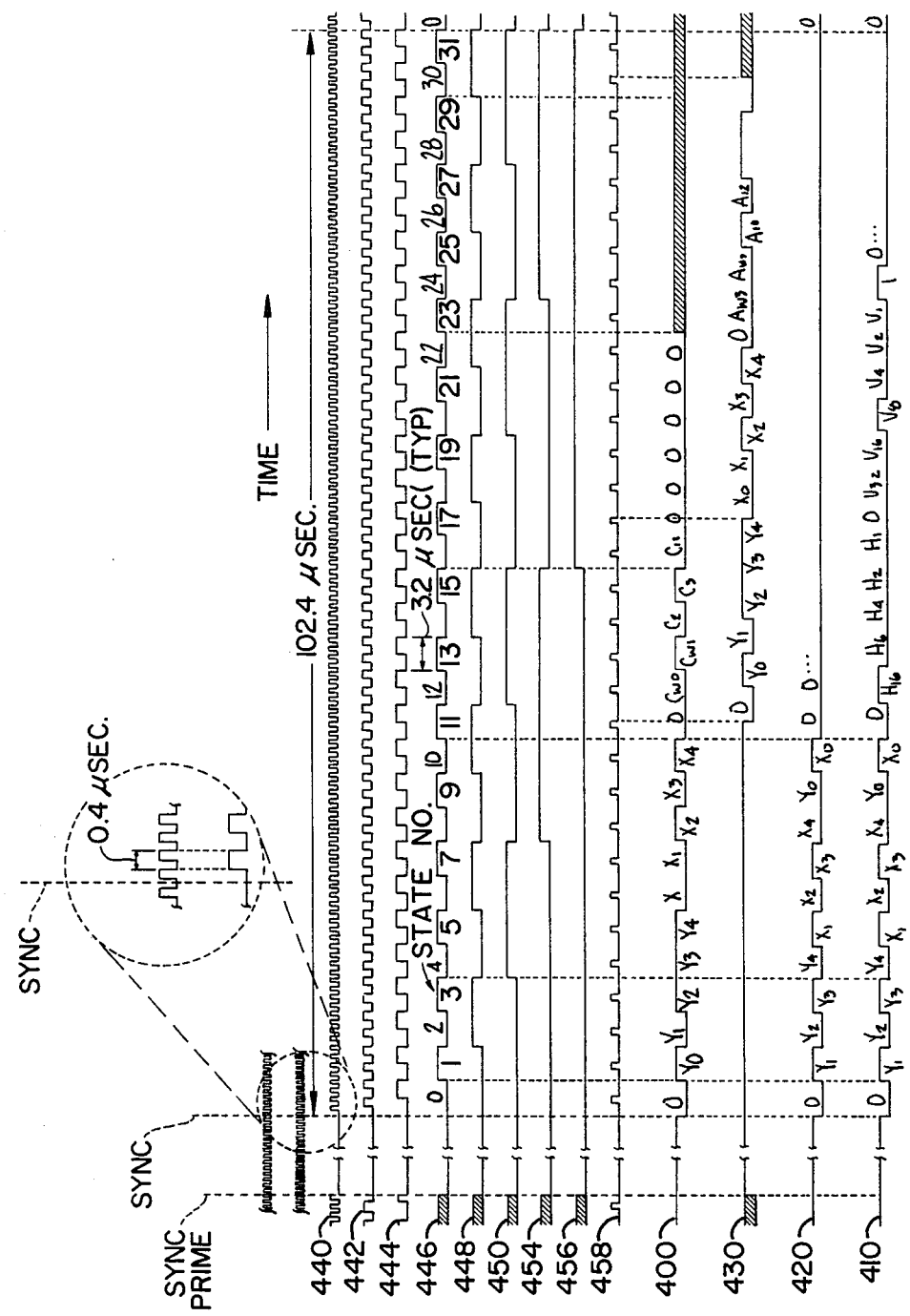
FIG._7.

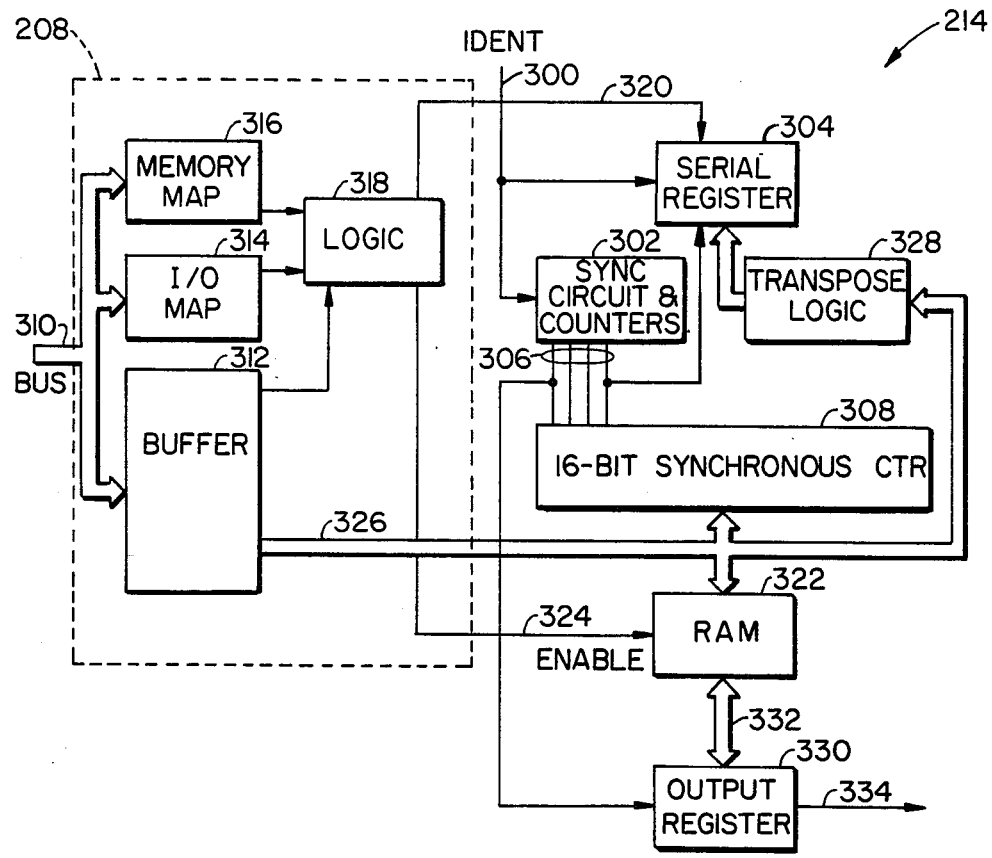
FIG._8.
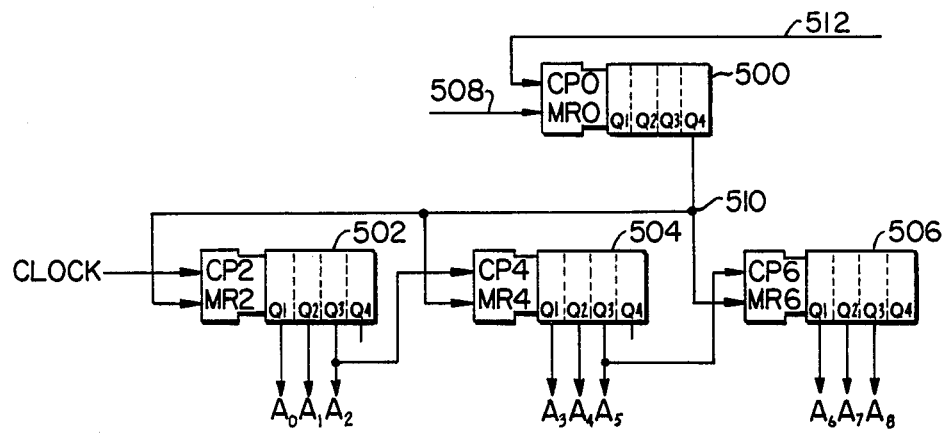
FIG._9.

NUCLEAR SYSTEM TEST SIMULATOR

This document includes two Microfiche Appendices: Appendix A, consisting of 5 fiche having 315 frames, lists an exemplary computer program for use in the preferred embodiment of the invention; and Appendix B, consisting of two fiche having 75 frames, provides a set of schematic diagrams of a preferred embodiment of the invention.

This invention relates generally to nuclear reactors, and more specifically to a simulation, analysis and test apparatus and process for automated checkout of the nuclear control rod drive system.

BACKGROUND OF THE INVENTION

Reactivity and the resulting power level of a nuclear boiling water reactor (BWR) is adjusted by moving control rods in the nuclear core. A large reactor uses about 185 such rods. Each rod is driven in or out of the core in discrete steps by a hydraulic drive mechanism, which, in a typical installation, is controlled by four solenoid valves in a hydraulic control unit.

A rod drive control system allows an operator to control these solenoid valves and, through them, the positioning of all the rods in the core. The basic function of the rod drive control system involves the operator's choice of a particular rod and the timed control of the solenoid valves to drive the rod in or out. The system returns status information from each hydraulic control unit.

Due to the nature and sophistication of nuclear reactor systems and their associated electronics, comprehensive testing equipment has been developed. Typically, such testing equipment is built into the system, and requires considerable space and complexity.

Numerous tests are performed by this equipment, including the status of control rod drive and instrumentation systems. These tests are impeded by several factors: first, the control rods may not normally be moved during shutdown plant conditions; second, the operator must monitor the tests at his or her control panel located some 200 to 500 feet from the valves and rods themselves; third, the response of the rods to control commands are complex signals which require sophisticated and highly expert knowledge to decipher.

SUMMARY OF THE INVENTION

What is provided as invention is a portable, microprocessor-based test instrument for the calibration, testing, and checkout of nuclear power reactor systems under simulated operating conditions.

Included in the invention is a process using the instrument to check out reactor control instrumentation by simulating inputs, outputs and closed loop responses in real time, and to deliberately inject faulted signals to the system.

The instrument is expandable to perform a variety of applications through the use of a master microprocessor bus with direct communication to interchangeable plug-in printed circuit board modules. Such applications include rod control simulation and analysis, neutron monitoring system analysis, and rod block monitoring system simulation and analysis.

The portable test instrument of the instant invention is designed to electrically interconnect at any of a plurality of points within the control and monitoring systems of the reactor. The electrical network from the point of interconnection to the control rods is thereupon disabled and the test instrument, located at close proximity to the point of interconnection, receives serial control command signals just as would the disabled portion of the network, and generates appropriate acknowledgements and response signals just as would the disabled portion as if it were performing properly the command. Alternatively, the instrument can generate faulty response signals simulating improper responses to the command.

The instrument is provided with a cathode ray tube (CRT) display which permits the operator to monitor the simulated control rod movements in a readily comprehensible fashion.

BRIEF DESCRIPTION OF THE DRAWINGS

FIG. 1 is a perspective view of the external appearance of the nuclear system test simulator of this invention;

FIG. 2 is a view of the top panel of the nuclear system test simulator as seen on its video display;

FIG. 3 is the Rod Control and Information System signal flow diagram;

FIG. 4 is a view of a core map illustrating a 177-control rod row and column coordinate scheme;

FIG. 5 is a functional block diagram of the five subassemblies comprising the nuclear system test simulator of this invention;

FIG. 6 is a functional block diagram of the dual word generator/receiver subassembly of the present invention;

FIG. 7 is a timing diagram which illustrates a typical command word received by the present invention, and typical acknowledge and response words generated by the present invention;

FIG. 8 is an a functional block diagram of a typical word generator and bus interface of the dual word generator/receiver subassembly of the present invention; and FIG. 9 is a circuit diagram of a typical synchronizer and counter circuit employed in the present invention.

DETAILED DESCRIPTION OF A PREFERRED EMBODIMENT

General Description

Instrument Case

The instrument is shown in FIG. 1. The nuclear system test simulator (NSTS) instrument 10 comes in a watertight case 12. When a cover is removed a front panel 14 with a cathode ray tube (CRT) display 16 and operator pushbuttons are exposed. Without cover, the instrument measures 10 inches high, 20.5 inches wide and 20 inches deep. Its weight is approximately 55 pounds. A removable lid on top covers a set of signal input/output jacks 18 and the power connector 20.

Front Panel

In addition to the CRT display 16, the front panel 14 contains eleven (11) backlighted pushbuttons which are the only keys required to operate the instrument (the power on/off switch is mounted elsewhere). To the left of the screen 16 are six (6) "softkeys" 22 used to select instrument functions and enter data. To the right are four (4) keys 24 to control the movement of a cursor when it appears on the screen, and a "break" key 26.

During the course of operation, the specific actions assigned each of the six softkeys 22 will change depending on current instrument function and video display. Moreover, all six keys may not be "active" (i.e. needed) at any given time. However, the current function of each key will always be shown on the screen 16 and all active keys will be backlighted. The assignment of functions to softkeys 22 follows a "tree oriented" structure such that a technician will only be able to perform those actions that are consistent with his or her menu selections. This feature reduces both setup time and the chances of operator error.

Like the softkeys, the four cursor control keys 24 are backlighted whenever they become active. The break key 26, used to halt continuously running simulations, is similarly backlighted.

Top Panel

With reference to FIG. 2, the top panel of the instrument 10 is covered by a watertight lid when the instrument is not in use, and contains a set of twelve connectors 28 that allow the NSTS to be electrically connected, via cables, to the selected point within the nuclear control and monitoring network. A set of adapters is provided to facilitate the required interconnections without undue disruption of existing plant cables.

Also mounted on the top panel are a CRT brightness control 30, and a connector 32, an on/off switch 34 and fuse holder 36 for incoming AC power. A picture of the top panel as shown in FIG. 2, with prompting aids, is stored in the NSTS and may be viewed on the CRT through use of the built-in software, specifically, the HELP system to be described below.

Application

When configured as a control rod simulator, the NSTS is designed to work with General Electric's BWR/4, 5 and 6 Boiling Water Reactors. For purposes of illustration, its use with a BWR/6 Rod Control and Information System (RC&IS) will be described.

Rod Control and Information System

With reference to FIG. 3, the Rod Control and Information System (RC&IS) is the system in a BWR/6 that enables a plant operator to select and maneuver control rods and that displays rod positions at all times. It consists of a set of components, both in the control room shown to the left of the dotted line as "A" in FIG. 3 and inside the containment shown to the right of the dotted line as "B" in FIG. 3, that generate, check and distribute digital electronic messages ("words") sent from an operator's console 36 to hydraulic control units 44 and from rod position probes 50 back to the console 36. A signal flow diagram, taken from an installation manual, is shown in FIG. 3. A simplified version of this diagram, with prompting aids, is also available through the HELP system for display on the CRT of the instrument.

With reference to FIG. 3, a general overview of the operation of the RC&IS is as follows:

(1) The plant operator selects the rod or rods to move at the Rod Interface System (RIS) benchboard console 36. Request words are sent to two redundant Rod Action Control System (RACS) cabinets 38 and 40.

(2) Each RACS cabinet independently evaluates the operator's request to insure that the desired rod motion will result in a permissible control rod pattern. Validated requests are transmitted to a Rod Gang Drive System (RGDS) cabinet 42.

(3) The RGDS cabinet 42 compares the validated rod movement commands from the two RACS cabinets 38 and 40 and, if they agree, sends Command words to a set of hydraulic control rod drive units 44 via a set of Branch Junction Amplifiers and Transponders 48.

(4) A set of Position Probes 50 underneath the pressure vessel measure rod positions and send Probe word messages to two redundant Rod Position Multiplexer (MUX) cabinets 52 and 54.

(5) The two RACS cabinets 38 and 40 independently compare measured rod positions against allowed rod pattern configurations. Position information is requested from the MUX cabinets 52 and 54 via IDENT words and received via Probe words.

(6) The RACS cabinets 38 and 40 send position information to the RGDS cabinet 42 for further transmittal to an operator's display 56 on the RIS console 36.

(7) The RGDS cabinet 42 sends position data to a plant process computer (not shown) by means of Process words sent via a Computer Interface Module 58.

In addition to the signal processing described above, RC&IS has a built-in diagnostic system for the detection and evaluation of hardware malfunctions, improper operator requests, etc. The principal online diagnostic tools are Rod Pattern Controllers in the RACS cabinets 38 and 40 and an analyzer in the RGDS cabinet 42.

Simulator

The NSTS 10 of the present invention (FIG. 1) is a simulator designed to check out components of RC&IS when the reactor is shut down and is not designed for use during actual operation. The instrument may be connected into any of the communications paths shown in FIG. 3 in order to monitor, inject or simulate signals. For example:

(1) The NSTS can interface with the RC&IS (FIG. 3) to check out the operator benchboard control and display console. As a technician issues commands from this console 36, rods will appear to move in real time on the position display 56 matrix.

(2) The NSTS 10 can simulate the position multiplexer (MUX) cabinets 52 and 54 so that the RACS 38 and 40 and the RGDS 42 electronics can be checked out from the operator console 36 as if rods were actually being moved. Without this simulation, the MUX cabinets 52 and 54 would always be reporting the same rod positions thereby causing the RACS cabinets 38 and 40 to issue rod motion blocks (i.e. the system would always appear to be in error).

(3) The NSTS 10 can simulate the position probes 50 to check out the MUX cabinets 52 and 54.

(4) In addition to working with valid (correct) signals, predetermined faults can be injected into the system to check for proper system response.

It should be noted that for Nuclear Regulatory Commission safety requirements, the capability to actually move control rods has not been built into the NSTS 10. In fact, connection of the NSTS 10 necessitates disconnection of the portion of the RC&IS from the point of connection to the control rod drivers 44 and from the position probes 50 back to the point of connection of the NSTS 10, thereby disabling that portion of the RC&IS.

Operation

Turn On

When the backlighted ON/OFF button 34 on top of the instrument 10 is depressed the instrument is powered, the CRT 16 will warm up, and all front panel keys 22, 24 and 26 will be backlighted. After a few seconds, a welcoming message appears on the CRT screen 16 to be replaced by the Main Menu once a seven second initialization period has been completed. Only the softkeys 22 needed to select from this menu will remain backlighted.

Main Menu

The Main Menu offers the user the following five choices by pressing an appropriate one of the softkeys 22:

(1) SIMULATE—When pressed, a menu of all available simulations will appear on the screen (i.e. the NSTS 10 will simulate the operation of one or more RC&IS components). Upon making a selection an appropriate graphic will appear on the screen 16 with softkeys 22 and prompts layed out so as to guide the user through the instrument's operation. For every view shown the user, a HELP softkey is available (see below).

(2) INJECT—When pressed, a menu of all words that can be injected into RC&IS will appear (i.e. the NSTS 10 will inject known words into RC&IS so that resulting behavior can be observed). Once a selection has been made, basic NSTS operation is the same as for SIMULATE.

(3) MONITOR—Same as for INJECT, except that the designated word will be monitored rather than injected. Exact word formats can be entered for comparison against those actually received.

(4) OVERVIEW—When pressed, a series of views explaining both RC&IS and the NSTS, a dictionary of terms, and various diagrams will be presented to the user.

(5) HELP—When pressed, an information screen will appear.

Typical Operation

As the user operates the instrument 10 he or she will be making menu selections, positioning the cursor via keys 24 when it appears, and entering data via softkeys 22. As he or she does this, various views will appear on the screen 16 to guide him in setting up desired words and messages, rod patterns, faults to be injected, etc. An example of such a view, for a control rod core map, is shown in FIG. 4.

To illustrate the use of the various keys, a description of a user-generated word follows: The serial format for a 33-bit Process word which carries information from the RGDS to the Computer Interface Module can be simulated by the user by selecting each bit individually using the up/down cursor keys 24 and setting the bit to either a 1 or 0 using a Data Select softkey 22. A description accompanies each bit. During simulation, faults may be encountered which will cause the Process word to change. A Clear Fault softkey will return the word to its "no fault" condition. The Return to Previous Display softkey is self-explanatory. The use of the Help softkey is indicated below.

The core map illustrated in FIG. 4 is one associated with the Process word and gives the user an alternate means for its simulation. He or she may select any given rod through use of the four cursor control keys 24 and enter its simulated position via the two Rod Position softkeys 22. All rods in the selected rod's gang or group, or all control rods, may also be set to this same position by pushing a single softkey. Another set of possible user actions are presented when the -ETC- softkey is pressed.

HELP

For every functional display a series of HELP messages are available to the user whenever the HELP softkey is depressed. These messages, always in the same format, contain the following information for the display just vacated:

(1) A brief description of the display.
(2) The status of the NSTS.
(3) The required action of the user.
(4) A description of the function of every softkey.

In addition, the user can call up several other HELP displays on the CRT 16. These include:

(1) A picture of the RC&IS system diagram, similar to FIG. 3, with the point(s) of NSTS connection highlighted.

(2) A picture of the top of the NSTS instrument showing where to connect signal cables as shown in FIG. 2.

(3) A dictionary of often used terms and phrases.

Detailed Description Of The Rod Control Information System

The NSTS of the present invention is designed to operate in the electrical environment illustrated in FIG. 3. Operator inputs of the console 36 are: (1) the rod selected from a pushbutton array having one button for each rod; (2) the motion desired, either in or out; and (3) plant status information which is used to determine if rod motion is permissible. Control rods are assigned in gangs based upon reactor core flux distribution characteristics. The Rod Action Control Systems 38 and 40 assign these gang members of the selected rod. The request for rod motion is first compared against the plant status information as described earlier, and then, if permitted, causes a timed sequence of outputs to be generated on appropriate gang members.

The system applies signals to each rod, for the control function, on lines running from the control console 36 to the remote solenoid valves 44, a distance of several hundred feet. In addition, a status indication for each rod is returned in parallel form from the hydraulic control unit 44 to the control console display 56. A time-multiplexed method of signal transmission is utilized by the rod gang drive system. The operator inputs, for both rod selection and motion control, are multiplexed at the manual switches in the Rod Interface System 36.

Description of the NSTS

Chassis

The NSTS 10 includes a 16-bit microprocessor augmented with specially-designed printed circuit (PC) boards that adapt it to perform specified instrument functions. The rear half of the chassis is occupied by a cardfile which holds the following five subassemblies; each located on a separate PC board or boards:

(1) 16-Bit General Purpose Computer Board—This subassembly, based on the Intel 8088 microprocessor, exercises central control over all circuit subassemblies via the computer bus structure, determines the specific test instrument function to be performed at any given time, directs test signal input and output via the special circuit boards, and performs high speed simulation algorithms.

(2) ROM Memory Board—The various computer programs, data tables and operating aids are stored in 256 kilobytes of read only memory (ROM).

(3) Graphics Display Board—This subassembly generates high resolution character and line graphics for the CRT display.

(4) Standard I/O Board—This subassembly interfaces the front panel pushbuttons to the computer and performs digital test signal input/output.

(5) Special Purpose Boards—In order for the NSTS to transmit and receive signals compatible in format, level and timing with the network portion under test, special purpose circuit boards are required (two are used for the control rod simulator application). In addition, these boards monitor input signals, generate output signals and performs real time simulations under computer control.

This particular design permits a single NSTS to be used for the simulation of several plant systems through the exchange of one set of memory and special purpose boards for another.

The side of the chassis also houses a power supply for all electronics and lamps. The front of the instrument contains a high resolution, 9 inch, green phosphor CRT monitor together with its controller.

Detailed Description of NSTS Circuit Subassemblies

As mentioned above, the NSTS 10 comprises five subassemblies. FIG. 5 is a functional block diagram of the NSTS, as configured for control rod simulation. Connection Diagram 945E111, which is part of Appendix B, shows this in greater detail. A 16-bit microprocessor 110 provides control functions to the other subassemblies via a bus 112 interconnecting microprocessor 110 with all other subassemblies. Bus 112 conforms to the Institute of Electrical and Electronic Engineers (IEEE) "Multibus Standard 796." Microprocessor 110 is connected via parallel signal lines 114 to the six front panel pushbutton softkeys 116 (shown in FIG. 1 as 22). The microprocessor 110 can be connected via serial signal lines 118 to an external monitor or recording device such as a computer terminal, printer, or strip-chart.

A 256K-byte read only memory (ROM) 120 is connected to microprocessor 110 via bus 112 and is programmed to contain various utility driver and analysis routines coded in an assembly language compatible with microprocessor 110, and graphics libraries, computational and system software in a high-level language. A listing of the contents of ROM 120 is appended hereto as Appendix A. The function of microprocessor 110 is to identify, access and execute various of these routines, as needed, in response to the operator-selected softkeys 116 and the signals received at the serial inputs, to be described below.

The NSTS display is produced by a high-resolution character and line graphics display interface 130 connected to microprocessor 110 via bus 112. Interface 130 generates outputs on signal lines 132 a video signal which is received by a CRT controller and display 134. The CRT display (shown in FIG. 1 as 16) within block 134 is a 40-line by 84-column matrix display, preferably Model CIQ9 manufactured by ITOH Electronics, Inc., 5301 Beethoven Street, Los Angeles, Calif. 90066. The microprocessor 110 executes standard graphics libraries stored in ROM 120, and generates standard graphics signals on bus 112 which are used by interface 130 to provide the CRT controller 134 with standard video signals to display information on the CRT display 16 in response to commands from microprocessor 110. Interface 130 is preferably Micro Angelo Model MA 520 manufactured by SCION Corp., 12310 Pinecrest Road., Reston, Va. 22091.

An input/output (I/O) subassembly 140 provides a standard parallel interface between the backlighting of the front panel pushbutton softkeys 116, which are connected thereto by lines 142, and the bus 112, and between a set of external control rod position probe simulators and the bus 112. I/O subassembly 140 is preferably a Model SBC 519 Programmable I/O Expansion Board manufactured by INTEL, 3065 Bowers Avenue, Santa Clara, Calif. 95051. A signal cable 144 connects eleven control rod position probe simulators connected to the (I/O) subassembly 140 (via two rod position multiplexers), whenever the NSTS 10 is used to simulate position probes when testing the rod position multiplexer cabinets 52 and 54.

The above-mentioned microprocessor 110, ROM 120, graphics interface 130, and parallel I/O 140 subassemblies are well-known to those skilled in the art, and their structure, function and interconnection is apparent in view of the preceding description of the function of the overall NSTS 10, and particularly after the following discussion of the heart of the instant invention, being a fifth subassembly comprising a set of two word generator/receivers and a set of four transponders. Each word generator receives via receptacles 28 interconnecting the NSTS 10 to the nuclear control rod network. The twelve cable receptacles 28 appear on the right-hand side of FIG. 2.

Illustrated in FIG. 5 are the word generator/receiver 150, connected to bus 112, which receive serial command words on input lines 152, and generate serial response words on output lines 154. These command and response words are sent via the interconnecting word generator/receiver cables to the control rod network. Serial word input lines 152 are further connected to a set of four transponders 160, 162, 164 and 166. The transponders 160, 162, 164 and 166 generate serial acknowledge words on output lines 170, 172, 174 and 176, respectively. These words similarly are conveyed to the control network via the cables interconnecting the NSTS 10 to the network.

FIG. 6 illustrates the internal architecture of one of the two word generator/receiver 150, typical of the other, the NSTS having a total of twelve input channels and one of the four transponders 160, typical of the remaining three, 162, 164 and 166, shown in FIG. 5.

The word generator/receivers 150 include a switching network 200 which receives the serial inputs 152 (FIG. 5) which includes an IDENT word "A" received on signal input line 202 and a redundant IDENT word portion "B" received on signal input line 204. Also input to switching network 200 are the remaining portions of the serial inputs on signal input lines 206. Switching network 200 is connected to bus 112 (FIG. 5) via a bus interface 208. A detailed description of the bus interface is given below in connection with the transponder 160. Bus interface 208 is connected to the various elements of the word generator/receiver, including switching network 200, via signal lines 210.

Switching network 200 processes the serial word received on signal lines 206 based on the leading identifier portions of the word received on signal lines 202 and 204. A received serial command word has the so-called "General Electric (GE) serial format" illustrated in FIG. 7 and labelled 400. Under the control of microprocessor 110, while executing the appropriate routine stored in ROM 120, accessed in response to the identifier portions of the word received on lines 202 and 204, produces a "snapshot" whereby a (32-bit) byte-by-(32-bit) byte analysis in real time is performed by microprocessor 110 while executing the appropriate analysis routine stored in ROM 120. This analysis is stored in random access memory (not shown) for subsequent display on CRT display 16.

Switching network 200 is connected to a word receiver 212 which provides the switching network with information via signal lines 210 to facilitate further processing of the serial command word received on signal lines 206. Switching network 200 is also connected to a word generator "A" 214 via signal lines 216. The word generator 214 is also connected to microprocessor 110 via bus interface 208 and signal lines 210. As will be described below, under control of microprocessor 110 executing the appropriate driver utility routine stored in ROM 120, word generator 214 generates a serial response word 410 (FIG. 7) on signal line 218 simulating the response word which the proper positioning of the control rod would cause to be transmitted at this point in the system under the response to IDENT word as received at serial inputs 152 to dual generator/receiver 150.

The word generator/receivers 150 include a word generator "B" 220 connected to switching network 200 via signal lines 222 and connected to microprocessor 110 via bus interface 208 and signal lines 210. Word generator "B" 220 functions as does word generator "A" 214 in all respects except that it responds to an identifier portion on input signal lines 204. Word generator B generates its serial response word on signal line 224.

FIG. 6 also illustrates the internal architecture of the transponder 160, typical of the transponders 162, 164 and 166. Transponder 160 includes a synchronizer and counter circuit 230 which receives on input signal lines 232 one of the serial inputs on signal lines 206. The synchronizer and counter circuit 230 recognizes the start of a GE serial format command word 400 (FIG. 7) received on serial input lines 152 and "frames up" this word for further processing by transponder 160, as will be described more fully below. A detailed description and circuit diagram of the synchronizer and counter circuit 230, typical of other synchronizer and counter circuits 302 and 308 illustrated in FIG. 8, will be given on sheet 21.

Connected to the output of synchronizer and counter circuit 230 are an operator follow state logic circuit 234 and a serial circuit 236. The operator follow state logic circuit 234 continually monitors each command word received by the transponder 160 at input signal lines 232 and if the operator requests a change, such as moving a control rod, the command so received will cause follow logic circuit 234 to generate an interrupt on line 238 which is transmitted to microprocessor 110 (on a signal line not shown in FIG. 5). This process is effected by comparing several past command words received on lines 232 with the present word received as will be described more fully below.

A peak insertion circuit 240 injects a signal into the serial circuit 236 as required by the GE serial format. FIG. 7 also illustrates an "acknowledge" word stored in a random access memory (RAM) 242. RAM 242 is connected to serial circuit 236 and acknowledge words can be serially conveyed to the circuit following the injection of the signal by circuit 240. Serial circuit 236 generates the acknowledge word on a signal line 244 (170 on FIG. 5).

To further describe the structure and operation of the word generator/receivers 150, reference should be had to FIG. 8, which illustrates the internal structure of the word generator "A" 214 (FIG. 6), typical of the other word generator used within the NSTS instrument of the present invention. FIG. 6 also illustrates the internal structure of the bus interface 208 (FIG. 6) typical of each such interface used within all word generator/receivers of the NSTS 10.

An IDENT word portion 420 of the serial word (FIG. 7) received on signal input line 202 (FIG. 6) is recognized and passed by the switching network 200 (FIG. 6) to the word generator "A" 214 via signal line 300 (216 on FIG. 6). Signal line 300 is connected to a synchronizer and counter circuit 302 and to a serial register 304. Reception of the identifier portion of the serial command word by the synchronizer and counter circuit 302 causes the circuit to generate timing signals on timing signal lines 306 via an internal read only memory (ROM) which are received on lines 306 by a 16-bit synchronous counter 308, and used thereby as a seed which is unique to the particular identifier received by word generator 214.

Contemporaneously with the above process, the proper serial response word 410 (FIG. 7) has been read from ROM 120 (FIG. 5) under control of the microprocessor 110 (FIG. 5) and is available for transmittal via bus 310 (112 on FIG. 5). Bus interface 208 (FIG. 6) includes a buffer circuit 312, an input/output (I/O) map 314 and a memory map 316 which each are connected to bus 310 and receive a portion of the information thereon.

The I/O map 314 is configured by a combinatorial logic circuit 318 consisting of a digital comparator and ROM. Generator modes and receiver reads are controlled by this I/O Map.

The memory map 316 is also connected to a combinatorial logic circuit 318 and the memory map 316 generates a signal to the logic circuit 318 indicating that the particular word generator, here "A" or 214, has been selected. Logic circuit 318 supplies this information to serial register 304 via a mode selection signal line 320. In response to reception from the memory map 316, logic circuit 318 generates an enable signal which is received by a random access memory (RAM) 322 on an enable signal line 324.

The appropriate serial response word read from ROM 120 (FIG. 5) is available on buffer circuit 312 and will be transmitted therefrom via an internal bus 326 to the RAM 322, in response to the enable signal. Once stored in RAM 322, the various portions of the serial response word as shown in FIG. 7 can be addressed via internal bus 326 as dictated by the timing pattern circulated in the 16-bit synchronous counter 308 which is connected to the RAM 322 and a transpose logic circuit 328 via the internal bus 326.

The transpose logic circuit 328 is connected via internal bus 326 with the serial register 304 so that following storage of the mode selection information therein, the timing pattern circulating in counter 308 can be loaded from register 304 via transpose logic circuit 328 into counter 308.

A data bus 332 connects the RAM 322 to an output register 330 and the serial response word pattern stored within the RAM 322 can be transmitted to the output register 330 under control of the synchronous counter 308 which synchronizes the transmittal of addresses to the RAM so that the various portions of the serial response word 410 (FIG. 7) are conducted to the output register 330 on signal lines 332 in accordance with the GE format timing pattern.

The resulting response word stored input register 330 can be serially transmitted on a signal line 334 (154 on FIG. 5). Both the serial command word received 400 and the serial response word 410 generated by the NSTS 10 can be displayed as on the CRT by having the microprocessor 110 execute appropriate graphics routines stored in the ROM 120.

Once connected within the RC&IS (FIG. 3), the NSTS 10 of the instant invention simulates reception of command words at the serial inputs 152 (FIG. 5) from where they are communicated to the generator/receiver 150 (FIG. 5). With reference to FIG. 6, switching network 200 performs the above-mentioned comparison and if agreement is indicated thereby, the command words are passed via switching network 200 to word generator "A" 214 via signal lines 216 and to word generator "B" 220 via signal lines 222.

In normal operation, every Transponder 44 (FIG. 3) also receives and demultiplexes the command word and compares its own identity to that contained in the word. The one whose identity matches (called the "selected" Transponder) decodes the valve control signal and acts upon it. It also generates an "acknowledge word" 430 (FIG. 7) containing its identity and its drive unit status (including the status of the valve drive circuitry) and sends the word back to the console 36.

The NSTS 10 similarly provides the simulation of the Transponders by the transponder circuits 0, 1, 2 and 3 shown on FIG. 5 as 160, 162, 164 and 166, respectively. The command word as received on signal lines 152 (FIG. 5) and transmitted to the four transponders as shown. With reference to FIG. 6, the command word is transmitted via signal line 232 to synchronizer and counter circuit 230 which recognizes the particular identity portion of the command word received on input lines 232 and proceeds to "frame up" the remaining portion of the word if it is to be processed by this particular Transponder.

In this case, peak insertion circuit 240 places the correct identifier portion into serial circuit 236 and the remainder of the appropriate "acknowledge word" stored in RAM 242 is loaded into the serial circuit 236 thereby forming the proper "acknowledge word" to be returned via signal line 244.

At the operator control console 36, the operator may request a change at any time, such as moving a control rod, by sending the proper command signals. Under normal conditions, such a change would be recognized by the transponder. The NSTS simulates this by causing operator follow state logic circuit 234 to generate an interrupt on line 238 which is transmitted to microprocessor 110 (FIG. 5).

The Nuclear Power Plant coordinates of control rods as displayed on the system core map as shown on FIG. 4, have no meaning to the hardware used in the RC&IS system. Instead the hardware responds to binary X and Y addresses in the range of (X,Y)=(2,2) to (19,19). Conversion of Plant coordinates to a serial word bit addressing scheme can be easily accomplished by referring to the appropriate Plant arrangement of the control rods. The NSTS 10 of the present invention reproduces this conversion by having the microprocessor 110 execute the appropriate conversion routines stored in ROM 120 so that the appropriate core map display is generated by CRT controller 134, in response to graphics routines also stored in ROM 120.

As mentioned above, the NSTS 10 uses various synchronizing and counting circuits, such as 230 (FIG. 6) and 302 and 308 (FIG. 8), which accept serial word format inputs. A circuit diagram of one of these circuits, typical of the others, is shown in FIG. 9 which consists of four integrated circuit four-bit binary counters 500, 502, 504, and 506, which are preferably Model No. 74LS393 as manufactured by Signetics Corporation, 811 E. Argues Avenue, Sunnyvale, Calif. 94086.

Counter 500 receives at an asynchronous input terminal MR0 the serial word input on signal line 508. A synchronizing clock pulse from a system clock (not shown) is received at an input terminal CP2 of counter 502, which also receives at an MR2 the output of the fourth stage of counter 500 via signal line 510. Counters 504 and 506 also receive the output of the fourth stage of counter 508 via signal line 510 at input terminals MR4 and MR6, respectively.

The output of the third stage of counter 502 is supplied to a CP4 input to counter 504 and the output of the third stage of counter 504 is supplied to a CP6 input to counter 506. The outputs of the first three stages of counters 502, 504 and 506 are communicated to the address selection section of a read only memory (ROM) (not shown) which is associated with the synchronizing and rounding circuit of FIG. 9, to form a nine-bit address $A_0, A_1, \ldots A_8$.

A signal line 512 communicates the low-order bit of information of the ROM address specified by the address $A_0, A_1, \ldots A_8$ to a CP0 input to counter 500. This bit is used as the shift/load signal for the synchronizing and counting circuit.

With reference to FIG. 7, the system clock includes a microclock portion which contains three components, labelled $\mu_A$, $\mu_B$, $\mu_C$ shown on FIG. 7 as 440, 442 and 444, respectively. The frequency of $\mu_B$ is twice that of $\mu_C$ and that of $\mu_A$ is twice that of $\mu_B$. The three microclock signal components are applied to the CP2 input of counter 502 and will appear on the outputs, as synchronized by the input on line 510, so that $\mu_A$ is at the output of stage one of counter 502, $\mu_B$ is at the output of stage two, and $\mu_C$ is at the output of stage three simultaneously and form the high-order address bits $A_0$, $A_1$ and $A_2$ for the ROM.

The system clock also includes a program clock portion used as a state counter which contains five components, labelled $\pi_A$, $\pi_B$, $\pi_C$, $\pi_D$ and $\pi_E$ shown in FIG. 7 as 446, 448, 450, 452, and 454, respectively. These five program clock components are also applied to the CP2 input of counter 502, and have frequencies wherein $\pi_A$ is twice that of $\pi_B$, $\pi_B$ is twice that of $\pi_C$, $\pi_C$ is twice that of $\pi_D$, $\pi_D$ is twice that of $\pi_E$ and $\pi_A$ is half that of $\mu_C$. Thus when $\mu_A$ at the output of stage one of counter 502 and $\mu_B$ and $\mu_C$ are at the output of stages two and three as mentioned above, $\pi_A$ will be at the output of stage one of counter 504, and so on, so that at any given clock synchronizing pulse, the nine-bit ROM address consists of the serial word formed as $\mu_A$ $\mu_B$ $\mu_C$ $\pi_A$ $\pi_B$ $\pi_C$ $\pi_D$ $\pi_E$.

The shift/load signal is shown on the timing diagram FIG. 7 as 458 and is applied to the CP0 input of counter 500. Since the output of the fourth stage of the four-bit, counter 500 serves as the master reset for the remaining counters 502, 504 and 506. The counter is reloaded at every thirty-second pulse received at the CP0 input to counter 500. FIG. 7 therefore illustrates the signals present within the synchronizing and counter circuit for one such 32-pulse period.

Applicant has gone to length to set forth in the block diagrams herein the architecture and theory of operation of the logic components used herein. Out of an abundance of caution, applicant includes microfiche and actual production drawings appended hereto as Appendix B.

These production drawings have the generic areas of the respective block diagrams labeled thereon and show by standard part number, as of the application date hereof, standard, ordinarily-produced components, that can be used to produce the block diagram circuits shown in the drawings, especially in FIGS. 6, 8, and 9.

Using the production drawings with the architecture description given herein, construction of the logic constituting the novel portion of this invention can occur.

What is claimed is:

1. A transportable test simulator for a nuclear power plant, the nuclear power plant including a control panel, a reactor having a plurality of actuated rods for moving into and out of a reactor for causing said plant to operate, and a control rod network extending between said control panel and said reactor rods, said network serially transmitting command words between said panel and rods, said network further having connecting interfaces at preselected points remote from said control panel between said control panel and rods, said test simulator comprising:
   a test simulator input for transport to and connection into said network at at least one said interface for receiving said serial command words from said network, each said serial command including an identifier portion and a command portion;
   means for processing interior of said simulator for said serial command words for identifying that portion of said power plant designated in said identifier portion and processing said word responsive to the command portion of said word after said identification; means for generating a response word responsive to said command portion; and output means for sending and transmitting said response word to said nuclear power plant at said interface whereby said control panel responds to said response word.

2. The transportable test simulator of claim 1 wherein said means for processing further includes means for generating an acknowledged word responsive to said identifier portion and said output means further includes means for sending and transmitting said acknowledged word to said nuclear power plant at said interface whereby said control panel responds to the acknowledgement of said identifier portion.

3. The transportable test simulator of claim 1 wherein said response word to said command word comprises an erroneous plant output and wherein said means for processing interior of said simulator includes means for generating a response word which is an erroneous output.

4. The transportable test simulator of claim 1 further including at least a portion of a display on said test simulator for indicating visually to an operator at said test simulator at least a portion of either said command word, or said response word, and wherein said means for processing interior of said simulator includes means for generating said visual display responsive to said command word or said response word.

5. A process for testing a nuclear power plant with a test simulator wherein the nuclear power plant includes a control panel, a reactor having a plurality of actuated rods for moving in and out of a reactor for causing said plant to operate, and a control rod network extending between said control panel and said reactor rods, said network serially transmitting command words between said panel and rods each said serial command including an identifier portion and a command portion, said network including a plurality of connection interfaces at preselected points remote from said control panel within said network, the process of testing said nuclear power plant comprising the steps of:
   providing a transportable test simulator having inputs and outputs for connection into said network at said interfaces;
   transporting said test simulator to one of said interfaces; unplugging said interface to deactivate the command path between said control panel and reactor;
   connecting said simulator interstitially within said interface;
   processing interior of said simulator of said command words between said rods and control panel, said processing including the steps of identifying that portion of said power plant designated in said identifier portion and responding to the command portion of said word after said identification; generating a response word interior of said simulator responsive to said command portion; and outputting said command word at said interface whereby said control panel responds to said response word.

6. The nuclear power plant testing process of claim 5 wherein said processing interior of said simulator of said command words further includes the steps of generating an acknowledge word responsive to said identifier portion and outputting said acknowledged word at said interface whereby said control panel responds to the acknowledgement of said identifier portion.

7. The nuclear power plant testing process of claim 5 wherein said processing interior of said simulator of said command words includes the step of generating a response word which is an erroneous output.

8. The nuclear power plant testing process of claim 5 wherein the first step therein further includes providing a transportable test simulator having a display for indicating visually to an operator at said test simulator at least a portion of either said command word or said response word and wherein said processing interior of said simulator of said command words further including the steps of generating said visual display responsive to said command or response word and wherein said testing process further includes the step of visually monitoring at said simulator at least a portion of either said command word, or said response word.

* * * * *